United States Patent [19]

Kataoka et al.

[11] Patent Number: 5,795,839
[45] Date of Patent: *Aug. 18, 1998

[54] CATALYST COMPONENTS FOR POLYMERIZATION OF OLEFINS

[75] Inventors: Naoki Kataoka; Yosuke Numao; Takashi Seki; Yoshio Tajima; Kazuo Matsuura, all of Yokohama, Japan

[73] Assignee: Nippon Oil Co., Ltd., Tokyo, Japan

[*] Notice: The term of this patent shall not extend beyond the expiration date of Pat. No. 5,707,914.

[21] Appl. No.: 461,604

[22] Filed: Jun. 5, 1995

Related U.S. Application Data

[60] Continuation of Ser. No. 212,444, Mar. 14, 1994, abandoned, which is a division of Ser. No. 974,546, Nov. 12, 1992, Pat. No. 5,331,071.

[30] Foreign Application Priority Data

Nov. 12, 1991 [JP] Japan ............... 3-323848
Nov. 12, 1991 [JP] Japan ............... 3-323849

[51] Int. Cl.$^6$ ............................................. C08F 04/64
[52] U.S. Cl. ............ 502/126; 502/117; 502/127; 502/159; 526/153; 526/160; 526/943
[58] Field of Search ............ 502/117, 126, 502/159, 127; 526/153, 160

[56] References Cited

U.S. PATENT DOCUMENTS

| | | | |
|---|---|---|---|
| 4,367,161 | 1/1983 | Swift et al. | 252/429 |
| 4,530,912 | 7/1985 | Pullukat et al. | 502/104 |
| 4,634,687 | 1/1987 | Fujita et al. | 502/121 |
| 4,892,851 | 1/1990 | Ewen et al. | 502/104 |
| 5,021,382 | 6/1991 | Malpass, Jr. | 502/117 |
| 5,049,535 | 9/1991 | Resconi et al. | 502/117 |
| 5,122,491 | 6/1992 | Kioka et al. | 502/117 |
| 5,126,301 | 6/1992 | Tsutsui et al. | 502/108 |
| 5,240,894 | 8/1993 | Burkhardt et al. | 502/108 |
| 5,334,684 | 8/1994 | Asanuma et al. | 526/279 |
| 5,451,555 | 9/1995 | Tajima et al. | 502/103 |

FOREIGN PATENT DOCUMENTS

| | | |
|---|---|---|
| A10260130 | 3/1988 | European Pat. Off. . |
| 279863 | 8/1988 | European Pat. Off. . |
| A10447071 | 9/1991 | European Pat. Off. . |
| 1720785 | 7/1971 | Germany . |
| 58-19309 | 2/1983 | Japan . |
| A063-3234005 | 9/1988 | Japan . |
| A0222307 | 1/1990 | Japan . |
| 87/03889 | 7/1987 | WIPO . |

OTHER PUBLICATIONS

Communication of the European Patent Office, dated Apr. 26, 1993, relating to European Application No. 92310315.4 of Nippon Oil Co., Ltd.

Hawley's Condensed Chemical Dictionary, 11$^{th}$ edition p. 613.

Primary Examiner—David W. Wu
Attorney, Agent, or Firm—Panitch Schwarze Jacobs & Nadel

[57] ABSTRACT

A process for the polymerization of olefinic hydrocarbons is carried out in the presence of a catalyst comprising a catalyst component derived from reacting a compound of the formula $Me^1R^1{}_nX^1{}_{4-n}$, a compound of the formula $Me^2R^2{}_mX^2{}_{z-m}$, an organocyclic compound having two or more conjugated double bonds and a carrier of inorganic or polymeric material, and a modified organoaluminum compound having Al—O—Al bonds, the resulting polyolefins having a relatively wide molecular weight distribution, a relatively narrow composition distribution and increased bulk density.

24 Claims, 1 Drawing Sheet

CATALYST COMPONENTS FOR POLYMERIZATION OF OLEFINS

This is a continuation of application Ser. No. 08/212,444, filed Mar. 14, 1994, now abandoned which is a division of application Ser. No. 07/974,546, filed Nov. 12, 1992, now U.S. Pat. No. 5,331,071.

BACKGROUND OF THE INVENTION

1. Field of the Invention

This invention relates to a process for the manufacture of olefinic polymers in the presence of a selected catalyst.

2. Prior Art

Catalyst compositions comprising zirconium compounds, typically metallocene and aluminoxane are known for use in the homopolymerization of olefins such as ethylene or the copolymerization of ethylene/alpha-olefins as disclosed for example in Japanese Laid-Open Patent Publication No. 58-19309. While the disclosed prior art process is advantageous so far as concerns the availability of polymerized products at increased rate of yield, it has a drawback in that the polymers obtained have a relatively narrow distribution of molecular weight or composition, coupled with a relatively low molecular weight. When taking into account the molecular weight alone, it would be possible to increase the molecular weight of a polymer to some extent by making a proper selection of transition metals from among the group of metallocene. The molecular weight of a polymer may be increased by the use of a transition metal compound having a 2,3 and 4-substituted cyclopentadienyl group as disclosed in Japanese Laid-Open Patent Publication No. 63-234005, or by the use of a hafnium compound having a ligand bonded to at least two cross-linked conjugated cycloalkadienyl groups as disclosed in Japanese Laid-Open Patent Publication No. 2-22307. However, such catalyst components are complicated if not difficult to synthesize. The use of hafnium compounds is not very conducive to polymer yields. The prior catalysts being often soluble in the reaction system are further disadvantageous in that the polymer resulting from slurry or gas-phase polymerization would have reduced bulk density and deteriorated granular properties.

SUMMARY OF THE INVENTION

With the foregoing difficulties of the prior art in view, the present invention seeks to provide a process for the manufacture of polyolefins in the presence of a novel catalyst at increased rate of yields, which polyolefins have a relatively wide molecular weight distribution, a narrow composition distribution and improved granular quality.

This and other objects and features of the invention will appear clear from the following detailed description of certain preferred embodiments.

According to the invention, there is provided a process for the manufacture of polyolefins which comprises polymerizing a wide range of olefinic hydrocarbons in the presence of a catalyst composition which comprises a first component (I) and a second component (II), said component (I) resulting from the reaction of a compound (i) of the formula $$Me^1R^1{}_nX^1{}_{4-n}$$

wherein $R^1$ is a hydrocarbon moiety of 1–24 carbon atoms, $X^1$ is a halogen atom, $Me^1$ is a metal of the group of zirconium, titanium and hafnium, and n is an integer of $0 \leq n \leq 4$; a compound (ii) of the formula wherein $R^2$ is a hydrocarbon group of 1–24 carbon atoms, $X^2$ is an alkoxy group of 1–12 carbon atoms or a halogen atom, $Me^2$ is an element of I–III Groups in the Periodic Table, z is the valence of $Me^2$, and m is an integer of $0 \leq m \leq 3$; an organocyclic compound (iii) having two or more conjugated double bonds; and an inorganic carrier and/or particulate polymer carrier (iv), said component (II) being a modified organoaluminum compound having Al—O—Al bonds derived from the reaction of an organoaluminum compound and water.

DETAILED DESCRIPTION OF THE INVENTION

Figure 1:
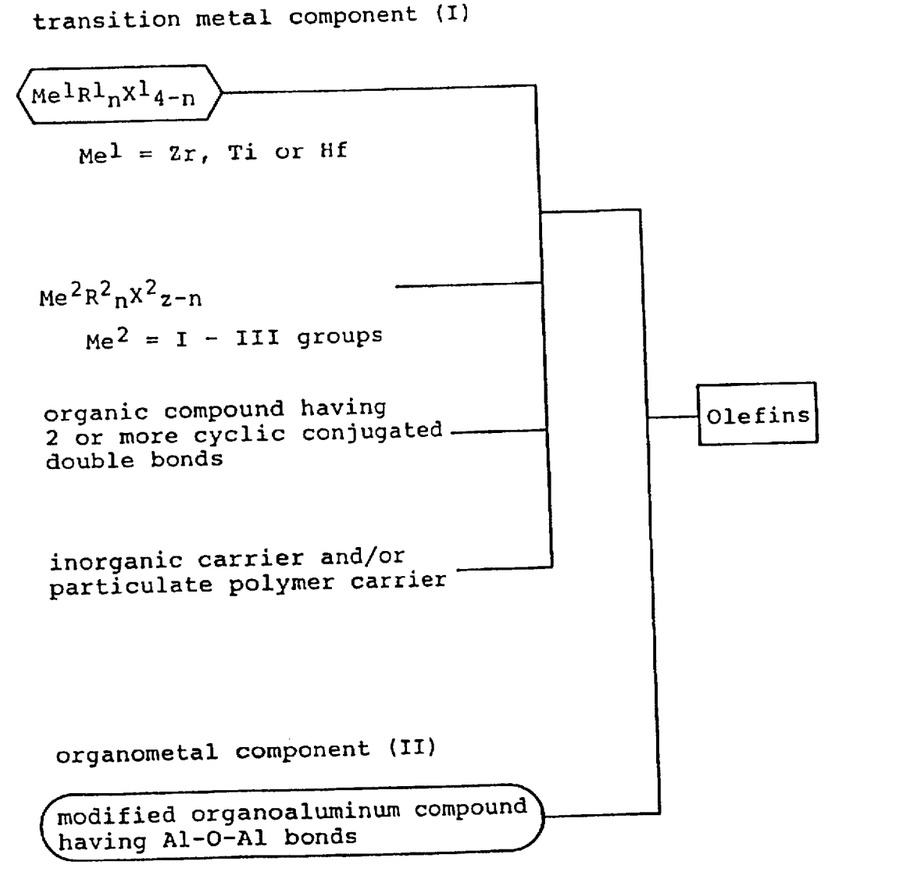
FIG. 1 is a flow chart utilized to explain the process of preparing a catalyst used in the invention.

The compound (i) which is used in the preparation of Component (I) of the inventive catalyst composition is represented by the formula $Me^1R^1{}_nX^1{}_{4-n}$ wherein $R^1$ is a hydrocarbon moiety having a carbon number of from 1 to 24, preferably from 1 to 8, including an alkyl group such as methyl, ethyl, propyl, butyl, pentyl, hexyl and octyl an alkenyl group such as vinyl and allyl, an aryl group such as phenyl, tolyl and xylyl, an aralkyl group such as benzyl, phenethyl, styryl and neophyl\*, an alkoxy group such as methoxy, ethoxy, propoxy, butoxy and pentyloxy, an aryloxy group such as phenoxy and tolyoxy, and an aralkyloxy group such as benzyloxy. $X^1$ in the formula is a halogen atom such as fluorine, iodine, chlorine and bromine. $Me^1$ is titanium, zirconium or hafnium, ziconium being preferred. n is $0 \leq n \leq 4$, preferably $0 < n \leq 4$.

* Neophyl is also known as 2-methyl-2-phenylpropyl $[C_6H_5C(CH_3)_2CH_2—]$.

Specific examples of the compound (i) include tetramethyl zirconium, tetraethyl zirconium, tetrapropyl zirconium, tetra-n-butyl zirconium, tetrapentyl zirconium, tetraphenyl zirconium, tetratolyl zirconium, tetrabenzyl zirconium, tetramethoxy zirconium, tetraethoxy zirconium, tetrapropoxy zirconium, tetrabutoxy zirconium, tetraphenoxy zirconium, tetratolyoxy zirconium, tetrapentyloxy zirconium, tetrabenzyloxy zirconium, tetraallyl zirconium, tetraneophyl zirconium, trimethylmonochlorozirconium, triethylmonochlorozirconium, tripropylmonochlorozirconium, tri-n-butylmonochlorozirconium, tribenzylmonochlorozirconium, dimethyldichlorozirconium, diethyldichlorozirconium, di-n-butyldichlorozirconium, dibenzyldichlorozirconium, monomethyltrichlorozirconium, monoethyltrichlorozirconium, mono-n-butyltrichlorozirconium, monobenzyltrichlorozirconium, tetrachlorozirconium, tetramethoxyzirconium, trimethoxymonochlorozirconium, dimethoxydichlorozirconium, monomethoxytrichlorozirconium, tetraethoxyzirconium, triethoxymonochlorozirconium, diethoxydichlorozirconium, monoethoxytrichlorozirconium, tetraisopropoxyzirconium, triisopropoxymonochlorozirconium, diisopropoxydichlorozirconium, monoisopropoxytrichlorozirconium, tetra-n-butoxyzirconium, tri-n-butoxymonochlorozirconium, di-n-butoxydichlorozirconium, mono-n-butoxytrichlorozirconium, tetrapentoxyzirconium, tripentoxymonochlorozirconium, dipentoxydichlorozirconium, monopentoxytrichlorozirconium, tetraphenoxyzirconium, triphenoxymonochlorozirconium, diphenoxydichlorozirconium, monophenoxytrichlorozirconium, tetratolyoxyzirconium, tritolyoxymonochlorozirconium, ditolyoxydichlorozirconium, monotolyoxytrichlorozirconium, tetrabenzyloxyzirconium, tribenzyloxymonochlorozirconium, dibenzyloxydichlorozirconium, monobenzyloxytrichlorozirconium, trimethylmonobromozirconium, triethylmonobromozirconium, tripropylmonobromozirconium, tri-n-butylmonobromozirconium, tribenzylmonobromozirconium, dimethyldibromozirconium, diethyldibromozirconium, di-n-butyldibromozirconium, dibenzyldibromozirconium, monomethyltribromozirconium, monoethyltribromozirconium, mono-n-butyltribromozirconium, monobenzyltribromozirconium, tetrobromozirconium, trimethoxymonobromozirconium, dimethoxydibromozirconium, monomethoxytribromozirconium, triethoxymonobromozirconium, diethoxydibromozirconium, monoethoxytribromozirconium, triisopropoxymonobromozirconium, diisopropoxydibromozirconium, monoisopropoxytribromozirconium, tri-n-butoxymonobromozirconium, di-n-butoxydibromozirconium, mono-n-butoxytribromozirconium, tripentoxymonobromozirconium, dipentoxydibromozirconium, monopentoxytribromozirconium, triphenoxymonobromozirconium, diphenoxydibromozirconium, monophenoxytribromozirconium, tritolyloxymonobromozirconium, ditolyloxydibromozirconium, monotolyloxytribromozirconium, tribenzloxymonobromozirconium, dibenzloxydibromozirconium, monobenzloxytribromozirconium, trimethylmonoiodozirconium, triethylmonoiodozirconium, tripropylmonoiodozirconium, tri-n-butylmonoiodozirconium, tribenzylmonoiodozirconium, dimethyldiioxozirconium, diethyldiioxozirconium, dipropyldiioxozirconium, di-n-butyldiioxozirconium, dibenzyldiioxozirconium, monomethyltriiodozirconium, monoethyltriiodozirconium, monopropyltriiodozirconium, mono-n-butyltriiodozirconium, monobenzyltriiodozirconium, tetraiodozirconium, trimethoxymonoiodozirconium, dimethoxydiiodozirconium, monomethoxytriiodozirconium, triethoxymonoiodozirconium, diethoxydiiodozirconium, monoethoxytriiodozirconium, triisopropoxymonoiodozirconium, diisopropoxydiiodozirconium, monoisopropoxytriiodozirconium, tri-n-butoxymonoiodozirconium, di-n-butoxydiiodozirconium, mono-n-butoxytriiodozirconium, tripentoxymonoiodozirconium, dipentoxydiiodozirconium, monopentoxytriiodozirconium, triphenoxymonoiodozirconium, diphenoxydiiodozirconium, monophenoxytriiodozirconium, tritolyoxymonoiodoiozirconium, ditolyoxydiiodozirconium, monotolyoxytriiodozirconium, tribenzyloxymonoiodozirconium, dibenzyloxydiiodozirconium, monobenzyloxytriiodozirconium, tribenzylmonomethoxyzirconium, tribenzylmonoethoxyzirconium, tribenzylmonopropoxyzirconium, tribenzylmonobutoxyzirconium,
tribenzylmonophenoxyzirconium, dibenzyldimethoxyzirconium, dibenzyldiethoxyzirconium, dibenzyldipropoxyzirconium, dibenzyldibutoxyzirconium, dibenzyldiphenoxyzirconium, monobenzyltrimethoxyzirconium, monobenzyltriethoxyzirconium, monobenzyltripropoxyzirconium, monobenzyltributoxyzirconium, monobenzyltriphenoxyzirconium, trineophylmonomethoxyzirconium, trineophylmonoethoxyzirconium, trineophylmonopropoxyzirconium, trineophylmonobutoxyzirconium, trineophylmonophenoxyzirconium, dineophyldimethoxyzirconium, dineophyldiethoxyzirconium, dineophyldipropoxyzirconium, dineophyldibutoxyzirconium, dineophyldiphenoxyzirconium, mononeophyltrimethoxyzirconium, mononeophyltriethoxyzirconium, mononeophyltripropoxyzirconium, mononeophyltributoxyzirconium, mononeophyltriphenoxyzirconium, tetramethyl titanium, tetraethyl titanium, tetrapropyl titanium, tetra-n-butyl titanium, tetrapentyl titanium, tetraphenyl titanium, tetraatolyl titanium, tetrabenzyl titanium, tetramethoxy titanium, tetraethoxy titanium, tetrapropoxy titanium, tetrabutoxy titanium, tetraphenoxy titanium, tetratolyoxy titanium, tetrapentyloxy titanium, tetrabenzyloxy titanium, tetraallyl titanium, tetraneophyl titanium, trimethylmonochlorotitanium, triethylmonochlorotitanium, tripropylmonochlorotitanium, tri-n-butylmonochlorotitanium, tribenzylmonochlorotitanium, dimethyldichlorotitanium, diethyldichlorotitanium, di-n-butyldichlorotitanium, dibenzyldichlorotitanium, monomethyltrichlorotitanium, monoethyltrichlorotitanium, mono-n-butyltrichlorotitanium, monobenzyltrichlorotitanium, tetrachlorotitanium, tetramethoxytitanium, trimethoxymonochlorotitanium, dimethoxydichlorotitanium, monomethoxytrichlorotitanium, tetraethoxytitanium, triethoxymonochlorotitanium, diethoxydichlorotitanium, monoethoxytrichlorotitanium, tetraisopropoxytitanium, triisopropoxymonochlorotitanium, diisopropoxydichlorotitanium, monoisopropoxytrichlorotitanium, tetra-n-butoxytitanium, tri-n-butoxymonochlorotitanium, di-n-butoxydichlorotitanium, mono-n-butoxytrichlorotitanium, tetrapentoxytitanium, tripentoxymonochlorotitanium, dipentoxydichlorotitanium, monopentoxytrichlorotitanium, tetraphenoxytitanium, triphenoxymonochlorotitanium, diphenoxydichlorotitanium, monophenoxytrichlorotitanium, tetratolyoxytitanium, tritolyoxymonochlorotitanium, ditolyoxydichlorotitanium, monotolyoxytrichlorotitanium, tetrabenzyloxytitanium, tribenzyloxymonochlorotitanium, dibenzyloxydichlorotitanium, monobenzyloxytrichlorotitanium, trimethylmonobromotitanium, triethylmonobromotitanium, tripropylmonobromotitanium, tri-n-butylmonobromotitanium, tribenzylmonobromotitanium, dimethyldibromotitanium, diethyldibromotitanium, di-n-butyldibromotitanium, dibenzyldibromotitanium, monomethyltribromotitanium, monoethyltribromotitanium, mono-n-butyltribromotitanium, monobenzyltribromotitanium, tetrobromotitanium, trimethoxymonobromotitanium, dimethoxydibromotitanium, monomethoxytribromotitanium, triethoxymqnobromotitanium, diethoxydibroinotitanium, monoethoxytribromotitanium, triisopropoxymonobromotitanium, diisopropoxydibromotitanium, monoisopropoxytribromotitanium, tri-n-butoxymonobromotitanium, di-n-butoxydibromotitanium, mono-n-butoxytribromotitanium, tripentoxymonobromotitanium, dipentoxydibromotitanium, monopentoxytribromotitanium, triphenoxymonobromotitanium, diphenoxydibromotitanium, monophenoxytribromotitanium, tritolyloxymonobromotitanium, ditolyloxydibromotitanium, monotolyloxytribromotitanium, tribenzloxymonobromotitanium, dibenzloxydibromotitanium, monobenzloxytribromotitanium, trimethylmonoiodotitanium, triethylmonoiodotitanium, tripropylmonoiodotitanium, tri-n-butylmonoiodotitanium, tribenzylmonoiodotitanium, dimethyldiiodotitanium, diethyldiiodotitanium, dipropyldiiodotitanium, di-n-butyldiiodotitanium, dibenzyldiiodotitanium, monomethyltriiodotitanium, monoethyltriiodotitanium, monopropyltriiodotitanium, mono-n-butyltriiodotitanium, monobenzyltriiodotitanium, tetraiodotitanium, trimethoxymonoiodotitanium, dimethoxydiiodotitanium, monomethoxytriiodotitanium, triethoxymonoiodotitanium, diethoxydiiodotitanium, monoethoxytriiodotitanium, triisopropoxymonoiodotitanium, diisopropoxydiiodotitanium, monoisopropoxytriiodotitanium, tri-n-butoxymonoiodotitanium, di-n-butoxydiiodotitanium, mono-n-butoxytriiodotitanium, tripentoxymonoiodotitanium, dipentoxydiiodotitanium, monopentoxytriiodotitanium, triphenoxymonoiodotitanium, diphenoxydiiodotitanium, monophenoxytriiodotitanium, tritolyoxymonoiodoiodotitanium, ditolyoxydiiodotitanium, monotolyoxytriiodotitanium, tribenzyloxymonoiodotitanium, dibenzyloxydiiodotitanium, monobenzyloxytriiodotitanium, tribenzylmonomethoxytitanium, tribenzylmonoethoxytitanium, tribenzylmonopropoxytitanium, tribenzylmonobutoxytitanium, tribenzylmonophenoxytitanium, dibenzyldimethoxytitanium, dibenzyldiethoxytitanium, dibenzyldipropoxytitanium, dibenzyldibutoxytitanium, dibenzyldiphenoxytitanium, monobenzyltrimethoxytitanium, monobenzyltriethoxytitanium, monobenzyltripropoxytitanium, monobenzyltributoxytitanium, monobenzyltriphenoxytitanium, trineophylmonomethoxytitanium, trineophylmonoethoxytitanium, trineophylmonopropoxytitanium, trineophylmonobutoxytitanium, trineophylmonophenoxytitanium, dineophyldimethoxytitanium, dineophyldiethoxytitanium, dineophyldipropoxytitanium, dineophyldibutoxytitanium, dineophyldiphenoxytitanium, mononeophyltrimethoxytitanium, mononeophyltriethoxytitanium, mononeophyltripropoxytitanium, mononeophyltributoxytitanium, mononeophyltriphenoxytitanium, tetramethyl hafnium, tetraethyl hafnium, tetrapropyl hafnium, tetra-n-butyl hafnium, tetrapentyl hafnium, tetraphenyl hafnium, tetraatolyl hafnium, tetrabenzyl hafnium, tetramethoxy hafnium, tetraethoxy hafnium, tetrapropoxy hafnium, tetrabutoxy hafnium, tetraphenoxy hafnium, tetratolyoxy hafnium, tetrapentyloxy hafnium, tetrabenzyloxy hafnium, tetraallyl hafnium, tetraneophyl hafnium, trimethylmonochlorohafnium, triethylmonochlorohafnium, tripropylmonochlorohafnium, tri-n-butylmonochlorohafnium, tribenzylmonochlorohafnium, dimethyldichlorohafnium, diethyldichlorohafnium, di-n-butyldichlorohafnium, dibenzyldichlorohafnium, monomethyltrichlorohafnium, monoethyltrichlorohafnium, mono-n-butyltrichlorohafnium, monobenzyltrichlorohafnium, tetrachlorohafnium, tetramethoxyhafnium, trimethoxymonochlorohafnium, dimethoxydichlorohafnium, monomethoxytrichlorohafnium, tetraethoxyhafnium, triethoxymonochlorohafnium, diethoxydichlorohafnium, monoethoxytrichlorohafnium, tetraisopropoxyhafnium, triisopropoxymonochlorohafnium, diisopropoxydichlorohafnium, monoisopropoxytrichlorohafnium, tetra-n-butoxyhafnium, tri-n-butoxymonochlorohafnium, di-n-butoxydichlorohafnium, mono-n-butoxytrichlorohafnium, tetrapentoxyhafnium, tripentoxymonochlorohafnium, dipentoxydichlorohafnium, monopentoxytrichlorohafnium, tetraphenoxyhafnium, triphenoxymonochlorohafnium, diphenoxydichlorohafnium, monophenoxytrichlorohafnium, tetratolyoxyhafnium, tritolyoxymonochlorohafnium, ditolyoxydichlorohafnium, monotolyoxytrichlorohafnium, tetrabenzyloxyhafnium, tribenzyloxymonochlorohafnium, dibenzyloxydichlorohafnium, monobenzyloxytrichlorohafnium, trimethylmonobromohafnium, triethylmonobromohafnium, tripropylmonobromohafnium, tri-n-butylmonobromohafnium, tribenzylmonobromohafnium, dimethyldibromohafnium, diethyldibromohafnium, di-n-butyldibromohafnium, dibenzyldibromohafnium, monomethyltribromohafnium, monoethyltribromohafnium, mono-n-butyltribromohafnium, monobenzyltribromohafnium, tetrobromohafnium, trimethoxymonobromohafnium, dimethoxydibromohafnium, monomethoxytribromohafnium, triethoxymonobromohafnium, diethoxydibromohafnium, monoethoxytribromohafnium, triisopropoxymonobromohafnium, diisopropoxydibromohafnium, monoisopropoxytribromohafnium, tri-n-butoxymonobromohafnium, di-n-butoxydibromohafnium, mono-n-butoxytribromohafnium, tripentoxymonobromohafnium, dipentoxydibromohafnium, monopentoxytribromohafnium, triphenoxymonobromohafnium, diphenoxydibromohafnium, monophenoxytribromohafnium, tritolyloxymonobromohafnium, ditolyloxydibromohafnium, monotolyloxytribromohafnium, tribenzloxymonobromohafnium, dibenzloxydibromohafnium, monobenzloxytribromohafnium, trimethylmonoiodohafnium, triethylmononiodohafnium, tripropylmonoiodohafnium, tri-n-butylmonoiodohafnium, tribenzylmonoiodohafnium, dimethyldiioxohafnium, diethyldiioxohafnium, dipropyldiioxohafnium, di-n-butyldiioxohafnium, dibenzyldiioxohafnium, monomethyltriiodohafnium, monoethyltriiodohafnium, monopropyltriiodohafnium, mono-n-butyltriiodohafnium, monobenzyltriiodohafnium, tetraiodohafnium, trimethoxymonoiodohafnium, dimethoxydiiodohafnium, monomethoxytriiodohafnium, triethoxymonoiodohafnium, diethoxydiiodohafnium, monoethoxytriiodohafnium, triisopropoxymonoiodohafnium, diisopropoxydiiodohafnium, monoisopropoxytriiodohafnium, tri-n-butoxymonoiodohafnium, di-n-butoxydiiodohafnium, mono-n-butoxytriiodohafnium, tripentoxymonoiodohafnium, dipentoxydiiodohafnium, monopentoxytriiodohafnium, triphenoxymonoiodohafnium, diphenoxydiiodohafnium, monophenoxytriiodohafnium, tritolyoxymonoiodoiodohafnium, ditolyoxydiiodohafnium, monotolyoxytriiodohafnium, tribenzyloxymonoiodohafnium, dibenzyloxydiiodohafnium, monobenzyloxytriiodohafnium, tribenzylmonomethoxyhafnium, tribenzylmonoethoxyhafnium, tribenzylmonopropoxyhafnium, tribenzylmonobutoxyhafnium, tribenzylmonophenoxyhafnium, dibenzyldimethoxyhafnium, dibenzyldiethoxyhafnium, dibenzyldipropoxyhafnium, dibenzyldibutoxyhafnium, dibenzyldiphenoxyhafnium, monobenzyltrimethoxyhafnium, monobenzyltriethoxyhafnium, monobenzyltripropoxyhafnium, monobenzyltributoxyhafnium, monobenzyltriphenoxyhafnium, trineophylmonomethoxyhafnium, trineophylmonoethoxyhafnium, trineophylmonopropoxyhafnium, trineophylmonobutoxyhafnium, trineophylmonophenoxyhafnium, dineophyldimethoxyhafnium, dineophyldiethoxyhafnium, dineophyldipropoxyhafnium, dineophyldibutoxyhafnium, dineophyldiphenoxyhafnium, mononeophyltrimethoxyhafnium, mononeophyltriethoxyhafnium, mononeophyltripropoxyhafnium, mononeophyltributoxyhafnium, mononeophyltriphenoxyhafnium and the like, most preferred of which compounds are tetramethylzirconium tetraethylzirconium, tetrabenzylzirconium, tetrapropoxyzirconium, tetrabutoxyzirconium and tetrachlorozirconium.

The compound (ii) used in the invention is represented by the formula $Me^2R^2_m X^2_{z-m}$ wherein $R^2$ is a hydrocarbon group having a carbon number of from 1 to 24, preferably from 1 to 12, more preferably from 1 to 8, including an alkyl group such as methyl, ethyl, propyl, isopropyl, butyl, pentyl, hexyl, octyl, decyl and dodecyl, an alkenyl group such as vinyl and allyl, an aryl group such as phenyl, tolyl and xylyl, and an aralkyl group such as benzyl, phenethyl and styryl; $X^2$ is an alkoxy group of 1–12 carbon atoms, preferably 1–6 carbon atoms such as methoxy, ethoxy, propoxy and butoxy, or a halogen atom such as fluorine, iodine, chlorine and bromine; $Me^2$ is an element of Groups I–III in the Periodic Table; z is the valence of $Me^2$; and m is an integer of $0 \leq m \leq 3$.

Specific examples of the compound (ii) eligible for the purpose of the invention are methyllithium, ethyllithium, n-propyllithium, isopropyllithium, n-butyllithium, t-butyllithium, pentyllithium, octyllithium, phenyllithium, benzyllithium, dimethylmagnesium, diethylmagnesium, di-n-propylmagnesium, diisopropylmagnesium, di-n-butylmagnesium, di-t-butylmagnesium, dipentylmagnesium, methylmagnesium chloride, n-propylmagnesium chloride, isopropylmagnesium chloride, n-butylmagnesium chloride, t-butylmagnesium chloride, pentylmagnesium chloride, octylmagnesium chloride, phenylmagnesium chloride, benzylmagnesium chloride, methylmagnesium bromide, methylmagnesium iodide, ethylmagnesium bromide, ethylmagnesium iodide, n-propylmagnesium bromide, n-propylmagnesium iodide, isopropylmagnesium bromide, isopropylmagnesium iodide, n-butylmagnesium bromide, n-butylmagnesium iodide, t-butylmagnesium bromide, t-butylmagnesium iodide, pentylmagnesium bromide, pentylmagnesium iodide, octylmagnesium bromide, octylmagnesium iodide, phenylmagnesium bromide, phenylmagnesium iodide, benzylmagnesium bromide, benzylmagnesium iodide, dimethylzinc, diethylzinc, di-n-propylzinc, diisopropylzinc, di-n-butylzinc, di-t-butylzinc, dipentylzinc, dioctylzinc, diphenylzinc, dibenzylzinc, trimethylboron, triethylboron, tri-n-propylboron, triisopropylboron, tri-n-butylboron, tri-t-butylboron, tripentylboron, trioctylboron, triphenylboron and tribenzylboron.

The compound (ii) further includes an organoaluminum compound of the formulae $R_3Al$, $R_2AlX$, $RAlX_2$, $RAl(OR)X$ or $R_3Al_2X_3$ wherein R is a hydrocarbon group of 1–5 carbon atom and X is a halogen atom, specific examples of which include trimethylaluminum, triethylaluminum, diethylaluminum chloride, diethylaluminum bromide, diethylaluminum fluoride, diethylaluminum iodide, ethylaluminum dichloride, ethylaluminum dibromide, ethylaluminum difluoride ethylaluminum diiodide, tripropylaluminum, dipropylaluminum chloride, dipropylaluminum bromide, dipropylaluminum fluoride dipropylaluminum iodide, propylaluminum dichloride, propylaluminum dibromide, propylaluminum difluoride propylaluminum diiodide, triisopropylaluminum, diisopropylaluminum chloride, diisopropylaluminum bromide, diisopropylaluminuin fluoride, diisopropylaluminum iodide, ethylaluminum sesquichloride, ethylaluminum sesquibromide, propylaluminum sesquichloride, propylaluminum sesquibromide, n-buthylaluminum sesquichloride, n-buthylaluminum sesquibromide, isopropylaluminum dichloride, isopropylaluminum dibromide, isopropylaluminum difluoride, isopropylaluminum diiodide, tributylaluminum, dibutylaluminum chloride, dibutylaluminum bromide, dibutylaluminum fluoride, dibutylaluminum iodide, butylaluminum dichloride, butylaluminum dibromide, butylaluminum difluoride, butylaluminum diiodide, tri-sec-butylaluminum, di-sec-butylaluminum chloride, di-sec-butylaluminum bromide, di-sec-butylaluminum fluoride, di-sec-butylaluminum iodide, sec-butylaluminum dichloride, sec-butylaluminum dibromide, sec-butylaluminum difluoride, sec-butylaluminum diiodide, tri-tert-butylaluminum, di-tert-butylaluminum chloride, di-tert-butylaluminum bromide, di-tert-butylaluminum fluoride, di-tert-butylaluminum iodide, tert-butylaluminum dichloride, tert-butylaluminum dibromide, tert-butylaluminum difluoride, tert-butylaluminum diiodide, triisobutylaluminum, diisobutylaluminum chloride, diisobutylaluminum bromide, diisobutylaluminum fluoride, diisobutylaluminum iodide, isobutylaluminum dichloride, isobutylaluminum dibromide, isobutylaluminum difluoride, isobutylaluminum diiodide, trihexylaluminum, dihexylaluminum chloride, dihexylaluminum bromide, dihexylaluminum fluoride, dihexylaluminum iodide, hexylaluminum dichloride, hexylaluminum dibromide, hexylaluminum difluoride, hexylaluminum diiodide, tripentylaluminum, dipentylaluminum chloride, dipentylaluminum bromide, dipentylaluminum fluoride, dipentylaluminum iodide, pentylaluminum dichloride, pentylaluminum dibromide, pentylaluminum difluoride, pentylaluminum diiodide, methylaluminum methoxide, methylaluminum ethoxide, methylaluminum propoxide, methylaluminum butoxide, dimethylaluminum methoxide, dimethylaluminum ethoxide, dimethylaluminum propoxide, dimethylaluminum butoxide, ethylaluminum methoxide, ethylaluminum ethoxide, ethylaluminum propoxide, ethylaluminum butoxide, diethylaluminum methoxide, diethylaluminum ethoxide, diethylaluminum propoxide, diethylaluminum butoxide, propylaluminum methoxide, propylaluminum ethoxide, propylaluminum propoxide, propylaluminum butoxide, dipropylaluminum methoxide, dipropylaluminum ethoxide, dipropylaluminum propoxide, dipropylaluminum butoxide, butylaluminum methoxide, butylaluminum ethoxide, butylaluminum propoxide, butylaluminum butoxide, dibutylaluminum ethoxide, dibutylaluminum propoxide, dibutylaluminum butoxide and the like.

The compound (iii) is an organocyclic compound having two or more conjugated double bonds, examples of which include a cyclic hydrocarbon compound having two or more, preferably 2–4, more preferably 2–3, conjugated double bonds and a carbon number of 4–24, preferably 4–12, in the molecule such as an aralkylene of 7–24 carbon atoms, cyclopentadiene, substituted cyclopentadiene, indene, substituted indene, fluorene, substituted fluorene, cycloheptatriene, substituted cycloheptatriene, cyclooctatetraene and substituted cyclooctatetraene. Each of such substituted compounds has a substituting group such as alkyl or aralkyl of 1-12 carbon atoms.

Specific examples of the compound (iii) include cyclopentadiene, methylcyclopentadiene, ethylcyclopentadiene, t-butylcyclopentadiene, hexylcyclopentadiene, octylcyclopentadiene, 1,2-dimethylcyclopentadiene, 1,3-dimethylcyclopentadiene, 1,2,4-trimethylcyclopentadiene, 1,2,3,4-tetramethylcyclopentadiene, pentamethylcyclopentadiene, indene, 4-methyl-1-indene, 4,7-dimethylindene, 4,5,6,7-tetrahydroindene, fluorene, methylfluorene, cycloheptatriene, methylcycloheptatriene, cyclooctatraene and methylcyclooctatraene. These compounds may be bonded through the medium of an alkylene group of 2-8, preferably 2-3, carbon atoms, such bonded compounds including for example bisindenylethane, bis(4,5,6,7-tetrahydro-1-indenyl)ethane, 1,3-propanedinyl-bis(4,5,6,7-tetrahydro)indene, propylene-bis(1-indene), isopropyl(1-indenyl) cyclopentadiene, diphenylmethylene(9-fluorenyl) cyclopentadiene and isopropylcyclopentadienyl-1-fluorene.

Another class of eligible compound (iii) according to the invention is represented by the formula wherein Cp is a cyclopentadienyl group; $R^3$ is a hydrocarbon group of 1-24, preferably 1-12, carbon atoms including an alkyl group such as methyl, ethyl, propyl, butyl, pentyl, hexyl and octyl, an alkenyl group such as vinyl and allyl, an aryl group such as phenyl, tolyl and xylyl, and an arallyl group such as benzyl, phenethyl, styryl and neophyl; $X^3$ is a halogen atom including fluorine, iodine, chlorine and bromine; and r and s are $0<r\leq4$ and $0\leq s\leq3$, respectively, where $r+s\leq4$.

Specific examples of the above compound (iii) include monocyclopentadienyl silane, dicyclopentadienyl silane, tricyclopentadienyl silane, tetracyclopentadienyl silane, monocyclopentadienylmonomethyl silane, monocyclopentadienylmonoethyl silane, monocyclopentadienyldimethy silane, monocyclopentadienyldiethyl silane, monocyclopentadienyltrimethyl silane, monocyclopentadienyltriethyl silane, monocyclopentadienylmonomethoxy silane, monocyclopentadienylmonoethoxy silane, monocyclopentadienylmonophenoxy silane, monocyclopentadienylmonomethylmonochloro silane, monocyclopentadienylmonoethylmonochloro silane, monocyclopentadienylmonomethyldichloro silane, monocyclopentadienylmonoethyldichloro silane, monocyclopentadienyltrichloro silane, dicyclopentadienyldimethyl silane, dicyclopentadienyldiethyl silane, dicyclopentadienylmethylethyl silane, dicyclopentadienyldipropyl silane, dicyclopentadienylethylpropyl silane, dicyclopentadienyldiphenyl silane, dicyclopentadienylmethylphenyl silane, dicyclopentadienylmethylchloro silane, dicyclopentadienylethylchloro silane, dicyclopentadienyldichloro silane, dicyclopentadienylmonomethoxy silane, dicyclopentadienylmonoethoxy silane, dicyclopentadienylmonomethoxymonochloro silane, dicyclopentadienylmonoethoxymonochloro silane, tricyclopentadienylmonomethyl silane, tricyclopentadienylmonoethyl silane, tricyclopentadienylmonomethoxy silane, tricyclopentadienylmonoethoxy silane and tricyclopentadienylmonochloro silane.

A further eligible compound (iii) is represented by the formula wherein Ind is an indenyl group; $R^4$ is a hydrocarbon group of 1-24, preferably 1-12, carbon atoms including an alkyl group such as methyl, ethyl, propyl, butyl, pentyl, hexyl and octyl, an alkenyl group such as vinyl and allyl, an aryl group such as phenyl, tolyl and xylyl, and an aralkyl group such as benzyl, phenethyl, styryl and neophyl; $X^4$ is a halogen atom including fluorine, iodine, chlorine and bromine; and t and u are $0<t\leq4$ and $0\leq u\leq3$, respectively, where $t+u\leq4$.

Specific examples of the above compound (iii) include imonoindenyl silane, diindenyl silane, triindenyl silane, tetraindenyl silane, monoindenylmonomethyl silane, monoindenylmonoethyl silane, monoindenyldimethyl silane, monoindenyldiethyl silane, monoindenyltrimethyl silane, monoindenyltriethyl silane, monoindenylmonomethoxy silane, monoindenylmonoethoxy silane, monoindenylmonophenoxy silane, monoindenylmonomethylmonochloro silane, monoindenylmonoethylmonochloro silane, monoindenylmonomethyldichloro silane, monoindenylmonoethyldichloro silane, monoindenyltrichloro silane, bisindenyldimethyl silane, bisindenyldiethyl silane, bisindenylmethylethyl silane, bisindenyldipropyl silane, bisindenyldiphenyl silane, bisindenylmethylphenyl silane, bisindenylmethylchloro silane, bisindenylethylchloro silane, bisindenyldichloro silane, bisindenylmonomethoxy silane, bisindenylmonoethoxy silane, bisindenylmonomethoxymonochloro silane, bisindenylmonoethoxymonochloro silane, triindenylmonoethyl silane, triindenylmonoethyl silane, triindenylmonomethoxy silane, triindenylmonoethoxy silane and triindenylmonochloro silane.

An inorganic carrier and/or particulate polymer carrier is used as component (iv) of the catalyst composition. The inorganic carrier may be intrinsically in the form of particles, granules, flakes, foil or fibers, but, whatever the shape may be, should be 5-200 μm, preferably 10-100 μm in maximum length. The inorganic carrier is preferably porous, having a surface area of 50-1000 $m^2/g$ and a pore volume of 0.05-3 $cm^3/g$. It may be selected from the group consisting of a carbonaceous material, a metal, a metal oxide, a metal chloride, a metal carbonate, and a mixture thereof, which is calcined usually at 200°-900° C. in the air, nitrogen, argon or other inert gas. Suitable metals for the inorganic carrier (iii) are aluminum and nickel. Eligible metal oxides are Group I-VIII metal oxides of the Periodic Table including $SiO_2$, $Al_2O_3$, $MgO$, $CaO$, $B_2O_3$, $TiO_2$, $ZrO_2$, $Fe_2O_3$, $SiO_2 \cdot Al_2O_3$, $Al_2O_3 \cdot MgO$, $Al_2O_3 \cdot CaO$, $Al_2O_3 \cdot MgO \cdot CaO$, $Al_2O_3 \cdot MgO \cdot SiO_2$, $Al_2O_3 \cdot CuO$, $Al_2O_3 \cdot Fe_2O_3$, $Al_2O_3 \cdot NiO$ and $SiO_2 \cdot MgO$. The double oxides are not particularly restricted in terms of structure and component ratio when used in the invention. The metal oxides may have adsorbed thereto small quantities of moisture and may further contain a small amount of impurities.

The metal chloride used in the invention is a chloride of an alkaline metal or alkaline earth metal, preferably $MgCl_2$ and $CaCl_2$. Examples of the metal carbonate are magnesium carbonate, calcium carbonate and barium carbonate, while those of the carbonaceous material referred to herein are carbon black and activated carbon. The above metal oxides are most preferred amongst the other inorganic carrier materials.

The term particulate polymer as used herein as a catalyst support or carrier (iv) designates a solid particulate form of either thermoplastic or thermosetting resin having an average particle size 5–2,000 μm, preferably 10–100 μm, practically ranging from low molecular weight to ultra high molecular weight polymers as long as these polymers remain solid during the stages of catalyst preparation and polymerization reaction. Specific examples of the particulate polymer include ethylene polymers, ethylene alpha-olefin copolymers, propylene polymers or copolymers, poly-1-butene and like polyolefins preferably of 2–12 carbon atoms, polyester, polyamide, polyvinylchloride, polymethylacrylate, polymethylmethacrylate, polystyrene, polynorbornen and naturally occurring polymers as well as mixtures thereof. The foregoing inorganic and particulate polymer carriers may be used per se as component (iv) according to the invention. Alternatively, they may be pretreated with an organoaluminum compound such as trimethylaluminum, triethylaluminum, triisobutylaluminum, tri-n-hexylaluminum, dimethylaluminum chloride, diethylaluminum chloride and diethylmonoethoxyaluminum, a modified organoaluminum compound having Al—O—Al bonds, or a silane compound.

The inorganic carrier may be used after treatment with an active hydrogen-containing compound such as alcohol and aldehydes, an electron-donative compound such as ester and ether, or an alkoxide-containing compound such as tetraalkoxysilicate, tetraalkoxyaluminum and transition-metal tetraalkoxide.

The carriers may be contacted with various pretreating compounds in an atmosphere of an inert gas such as nitrogen or argon in the presence of an inert liquid hydrocarbon such as an aromatic hydrocarbon (6–12 carbon atoms) including benzene, toluene, xylene and ethylbenzene or an aliphatic or alicyclic hydrocarbon (5–12 carbon atoms) including heptane, hexane, decane, dodecane and cyclohexane, with or without stirring at −100° to 200° C., preferably −50° to 100° C. for 30 minutes to 50 hours, preferably 1–24 hours. This pretreatement reaction is carried out preferably in the presence of a solvent of an aromatic hydrocarbon such as benzene, toluene, xylene and ethylbenzene in which the pretreating compounds are rendered soluble. The resulting carrier may be readily put to use for the preparation of catalyst components without having to remove the solvent. If the pretreating compound, for example a modified organoaluminum compound, is insoluble or hardly soluble, there may be added pentene, hexane, decane, dodecane or cyclohexane to allow the reaction product to precipitate and thereafter dry. Alternatively, part or all of the aromatic hydrocabon solvent may be removed as by means of drying.

There is no particular restriction imposed upon the ratio of carrier/pretreating compound, the latter being usually 1–10,000 millimoles, preferably 5–1,500 millimoles per 100 grams carrier.

The various components (i)–(iv) used in the invention may be contacted in the following order:

(1) Components (i) through (iv) are all simultaneously contacted together.

(2) Components (i), (ii) and (iii) are contacted together and thereafter with component (iv).

(3) Components (ii), (iii) and (iv) are contacted together and thereafter with component (i).

(4) Components (i), (iii) and (iv) are contacted together and thereafter with component (ii).

(5) Components (i), (ii) and (iv) are contacted together and thereafter with component (iii).

(6) Components (i) and (ii) are contacted together, then with component (iii) and thereafter with component (iv).

(7) Components (i) and (ii) are contacted together, then with component (iv) and thereafter with component (iii).

(8) Components (i) and (iii) are contacted together, then with component (ii) and thereafter with component (iv).

(9) Components (i) and (iii) are contacted together, then with component (iv) and thereafter with component (ii).

(10) Components (i) and (iv) are contacted together, then with component (ii) and thereafter with component (iii).

(11) Components (i) and (iv) are contacted together, then with component (iii) and thereafter with component (ii).

(12) Components (ii) and (iii) are contacted together, then with component (i) and thereafter with component (iv).

(13) Components (ii) and (iii) are contacted together, then with component (iv) and thereafter with component (i).

(14) Components (ii) and (iv) are contacted together, then with component (i) and thereafter with component (iii).

(15) Components (ii) and (iv) are contacted together, then with component (iii) and thereafter with component (i).

(16) Components (iii) and (iv) are contacted together, then with component (i) and thereafter with component (ii).

(17) Components (iii) and (iv) are contacted together, then with component (ii) and thereafter with component (i).

(18) Components (i) and (iv) are contacted together, then with component (ii) and thereafter with component (iii).

(19) Components (i) and (iv) are contacted together, then with component (iii) and thereafter with component (ii).

It has now been found that the sequences (1), (2), (5), (7) and (8) above are most effective.

These four components (i) through (iv) may be, not restrictively, contacted in an atmosphere of an inert gas such as nitrogen or argon in the presence of an inert liquid hydrocarbon such as an aromatic hydrocarbon (6–12 carbon atoms) including benzene, toluene, xylene and ethylbenzene, or an aliphatic or alicyclic hydrocarbon (5–12 carbon atoms) including heptane, hexane, decane, dodecane and cyclohexane, with or without stirring at −100° to 200° C., preferably −50° to 100° C. for 30 minutes to 50 hours, preferably 1–24 hours. It is to be noted however that the reaction is conducted under conditions to retain the polymer carrier material substantially in a solid state.

Amongst the listed solvents are used most advantageously the aromatic hydrocarbons because the components (i), (ii) and (iii) are all soluble therein. Reference is made to the earlier mentioned procedures of pretreating the carrier materials for the utilization or disposal of the inert hydrocarbon solvents commonly used.

Component (ii) is used in an amount of 0.01–1,000 moles, preferably 0.1–100 moles, more preferably 1–10 moles per mole of component (i). Component (iii) is used in an amount of 0.01–100 moles, preferably 0.1–10 moles, more preferably 1–5 moles per mole of component (i). Component (i) is used in an amount by transition-metal concentration (Mel)of 0.01–500 millimoles, preferably 0.05–200 millimoles, more preferably 0.1–20 millimoles per 100 g of carrier (iv). The catalyst components used in the invention should have an atomic ratio of Al/Me$^1$ in the range of 0.1–2,000, preferably 15–1,000.

The term modified organoaluminum compound (II) is used herein to designate a reaction product of an organoaluminum compound and water which has 1–100, preferably 1–50 Al—O—Al bonds in the molecule. This reaction is usually conducted in the presence of an inert hydrocarbon such as pentane, hexane, keptane, cyclohexane, methylcyclohexane, benzene, toluene and xylene, of which aliphatic and aromatic hydrocarbons are preferred. The starting organoaluminum compound may be represented by the formula $$R^5_v AlX^5_{3-v}$$

where $R^5$ is an alkyl, alkenyl, aryl or aralkyl group having a carbon number of 1–18, preferably 1–12; $X^5$ is a hydrogen or halogen atom; and v is an integer of $1 \leq v \leq 3$.

The above compound is typically exemplified by trialkylaluminum having an alkyl group optionally such as methyl, ethyl, propyl, isopropyl, butyl, isobutyl, pentyl, hexyl, octyl, decyl and dodecyl groups, of which methyl group is particularly preferred.

The water/organoaluminum reaction takes place in a molar ratio of water:Al in the range of 0.25:1–1.2:1, preferably 0.5:1–1:1 at a temperature of usually –70° to 1° C., preferably –20° to 20° C., for a period of 5–24 hours, preferably 5–10 hours. As water for reaction with the organoaluminum compound, there may be used crystal water contained in hydrates of copper sulfate or aluminum sulfate.

The catalyst component (I) and the modified organoaluminum compound (II) may be supplied separately or as an admixture to the polymerization reaction system. In either case, they are used in a ratio such that the atomic ratio of aluminum in the organoaluminum compound (II) to transition metal in the catalyst component (I) remain in the range of 1–100,000, preferably 5–1,000.

The term olefins as used herein designates alpha-olefins, cyclic olefins, dienes, trienes and styrene analogs. Alpha-opefins have a carbon number of 2–12, preferably 2–8 and typically include ethylene, propylene, butene-1, hexane-1 and 4-methylpentene-1. These olefins may be homopolymerized or copolymerized such as by alternating, random or block copolymerization process.

The inventive process may be effectively applied where a diene compound such as butadiene, 1,4-hexadiene, ethylidene norbornene and dicyclopentadiene is used to reform the polymer product. In such a copolymerization reaction for example of ethylene and an alpha-olefin of 3–12 carbon atoms, it is desirable to hold an alpha-olefin content in the ethylene/alpha-olefin copolymer to 40 mole % or less, preferably 30 mole % or less, more preferably 20 mole % or less.

The polymerization reaction according to the invention is conducted in a slurry, solution or gase phase in the presence or absence of an inert hydrocarbon solvent such as an aliphatic hydrocarbon including hexane and heptane, an aromatic hydrocarbon including benzene, toluene and xylene, and an alicyclic hydrocarbon including cyclohexane, and methylcyclohexane, substantially without the presence of oxygen and water, at a temperature of 20°–200° C., preferably 50°–100° C. under a pressure of atmospheric –70 kg/cm$^2$G, preferably atmospheric –20 kg/cm$^2$G, for a time length of 5 minutes to 10 hours, preferably 5 minutes to 5 hours.

Whilst the molecular weight of the polymer product obtained may be adjusted to some extent by varying the polymerization temperature, the molar ratio of the catalyst and other polymerization parameters, it can be more effectively adjusted by introducing hydrogen into the reaction system.

The inventive process can be advantageously used also in multi-stage polymerizations where hydrogen concentration and reaction temperature vary.

The invention will be further described by way of the following examples.

Preparation of Modified Organoaluminum Compound (Methylalmoxane)

A 300-ml three-necked flask equipped with an electromagnetic stirrer was charged with 13 grams of copper sulfate heptahydrate and 50 ml of toluene. The admixture after being suspended was added at 0° C. and over 2 hours with droplets of 150 ml of a 1 mmol/ml triethylaluminum solution. The reaction was effected at 25° C. for 24 hours. Filtration of the reaction mixture and subsequent evaporation of excess toluene gave 4 grams of methylalmoxane (MAO) in the form of a white crystal.

Preparation of Catalyst Component A (1) Pretreatment of Carrier (iv)

A 300 cc three-necked flask was charged with 100 ml refined toluene and 10 g SiO$_2$ (surface area 300 m$^2$/g, Grade No. 952 of Fuji Davison) which had been calcined at 460° C. for 5 hours in nitrogen atmosphere, followed by addition of 6 ml toluene solution of methylalmoxane (concentration 2.5 mmol/ml). The admixture was stirred at room temperature for 2 hours and thereafter dried by nitrogen blow to yield a fluid particulate product.

(2) Preparation of Transition Metal Catalyst Component [Components (i)+(ii)+(iii)]

A 300 cc three-necked flask was charged with 100 ml refined toluene, 50 ml tetrahydrofuran (THF) solution of ethylmagnesium chloride (EtMgCl) (concentration 2 mols/l) and 2.2 g indene and cooled at –60° C. A separate flask was charged with 50 ml toluene, 4.2 g tetrapropoxyzirconium (Zr(OPr)$_4$) and 0.8 g indene. This solution was fed into the first flask, and the whole mixture therein was stirred at –60° C. for 1 hour, followed by heating with continued stirring up to 20° C. slowly over 2 hours. The reaction was continued at 45° C. for 3 hours.

(3) Preparation of Solid Catalyst Component [Components (i)+(ii)+(iii)+(iv)]

A 300 cc three-necked flask was charged with 10 g carrier prepared as above in nitrogen atmosphere and 30 ml toluene solution of transition metal catalyst component prepared as above, followed by 15 ml refined toluene. The admixture was stirred at room temperature for 2 hours, followed by removal of the solvent by nitrogen blow in vacuum thereby obtaining 11 g solid catalyst component A.

Preparation of Catalyst Component B (1) Pretreatment of Carrier (iv)

The same as for catalyst component A.

(2) Preparation of Transition Metal Catalyst Component [Components (i)+(ii)+(iii)]

A 300 cc three-necked flask was charged with 100 ml refined toluene, 9.8 g triethylboron ($ET_3B$) and 2.5 g cyclopentadiene and cooled at −60° C. A separate flask was charged with 4.2 g tetrapropoxyzirconium and 0.84 cyclopentadiene. The rest of the procedure was the same as in the preparation of Component A.

(3) Preparation of Solid Catalyst Component

[Components (i)+(ii)+(iii)+(iv)]

A 300 cc three-necked flask was charged with 10 g carrier prepared as above in nitrogen atmosphere and 35 ml toluene solution of transition metal catalyst component prepared as above, followed by addition of 15 ml refined toluene. The admixture was stirred at room temperature for 2 hours, followed by removal of the solvent by nitrogen blow in vacuum thereby obtaining solid catalyst component B.

Preparation of Catalyst Component C (1) Carrier (iv)

10 g $SiO_2$ (surface area 300 $m^2/g$, Grade. No. 952 of Fuji Davison) was used, which had been calcined at 600° C. for 5 hours. This carrier was not pretreated.

(2) Preparation of Transition Metal Catalyst Component [Components (i)+(ii)+(iii)]

A 300 cc three-necked flask was charged with 100 ml refined toluene, 25 ml tetrahydrofuran solution of n-butylmagnesium chloride (concentration 2 mols/l) and 1.7 g cyclopentadiene and stirred at room temperature for 30 minutes, followed by addition over 20 minutes of 4.2 g tetrapropoxyzirconium dissolved in 50 ml toluene. The reaction was continued at 45° C. for 3 hours.

(3) Preparation of Solid Catalyst Component

[Components (i)+(ii)+(iii)+(iv)]

A 300 cc three-necked flask was charged with 10 g carrier prepared as above in nitrogen atmosphere and 29 ml toluene solution of transition metal catalyst component prepared as above, followed by addition of 15 ml refined toluene. The admixture was stirred at room temperature for 2 hours, followed by removal of the solvent by nitrogen blow in vacuum thereby obtaining solid catalyst component C.

Preparation of Catalyst Component D (1) Pretreatment of Carrier (iv)

A 400 ml stainless steel pot containing 25 pieces of half inch stainless steel balls was charged with 10 g magnesium anhydrous chloride and 3.8 g triethoxyaluminum. The admixture was subjected to ball-milling in nitrogen atmosphere at room temperature.

(2) Preparation of Transition Metal Catalyst Component [Components (i)+(ii)+(iii)]

A 300 cc three-necked flask was charged with 100 ml refined toluene, 15.7 g of diethylzinc ($Et_2Zn$) and 5.9 g indene and stirred at room temperature for 30 minutes. 4.2 g tetrapropoxyzirconium dissolved in 50 ml toluene was added over 20 minutes. The reaction was continued at 45° C. for 3 hours.

(3) Preparation of Solid Catalyst Component

[Components (i)+(ii)+(iii)+(iv)]A 300 cc three-necked flask was charged with 10 g carrier prepared as above in nitrogen atmosphere and 27 ml toluene solution of transition metal catalyst component prepared as above, followed by addition of 15 ml refined toluene. The admixture was stirred at room temperature for 2 hours, followed by removal of the solvent by nitrogen blow in vacuum thereby obtaining solid catalyst component D.

Preparation of Catalyst Component E (1) Pretreatment of Carrier (iv)

10 g polyethylene powder dried at 60° C. for 3 hours (MFR 1.0 g/10 min, bulk density 0.41 g/cc, particle size 500 µm, melting point 121° C.) was added dispersively with 6 ml toluene solution of methylalmoxane (concentration 2.5 mmol/ml). The admixture was stirred at room temperature for 1 hour, followed by drying with nitrogen blow thereby obtaining a fluid particulate product.

(2) Preparation of Transition Metal Catalyst Component [Components (i)+(ii)+(iii)]

The procedure for the preparation of Catalyst Component A was followed except that 64 ml tetrahydrofuran solution of ethylmagnesium bromide (EtMgBr) (concentration 2 mols/l).

(3) Preparation of Solid Catalyst Component

[Components (i)+(ii)+(iii)+(iv)]

A 300 cc three-necked flask was charged with 10 g carrier prepared as above in nitrogen atmosphere and 38 ml toluene solution of transition metal catalyst component prepared as above, followed by addition of 15 ml refined toluene. The admixture was stirred at room temperature for 2 hours, followed by removal of the solvent by nitrogen blow in vacuum thereby obtaining solid catalyst component E.

Preparation of Catalyst Component F (1) Pretreatment of Carrier (iv)

The procedure for the preparation of Catalyst Component A was followed except that 10 g $Al_2O_3$ (surface area 300 $m^2/g$ and average particle size 60 µm) was used, which had been calcined at 400° C. for 5 hours.

(2) Preparation of Transition Metal Catalyst Component [Components (i)+(ii)+(iii)]

A 300 cc three-necked flask was charged with 100 ml refined toluene, 64 ml THF solution of ethylmagnesium chloride (concentration 2 mols/l) and 4.0 g methylcyclopentadiene. The admixture was stirred at room temperature for 30 minutes, followed by addition over 20 minutes of 4.9 g tetrabutoxyzirconium ($Zr(OBu)_4$) dissolved in 50 ml toluene. The reaction was continued with stirring at 45° C. for 3 hours.

(3) Preparation of Solid Catalyst Component

[Components (i)+(ii)+(iii)+(iv)]

The procedure for Catalyst Component A was followed except that the above solution of transition metal component was mixed with the carrier (iv) such that Zr deposits were 2.1 wt %.

Preparation of Catalyst Component G (1) Pretreatment of Carrier (iv)

The procedure for the preparation of Catalyst Component A was followed except that 15 ml n-hexane solution of trimethylaluminum ($AlMe_3$) (concentration 1 mmol/ml) was used.

(2) Preparation of Transition Metal Catalyst

Component [Components (i)+(ii)+(iii)]

A 300 cc three-necked flask was charged with 100 ml refined toluene, 64 ml THF solution of ethylmagnesium chloride (2 mols/l) and 3.4 cyclopentadiene. The admixture was stirred at room temperature for 30 minutes, followed by addition over 20 minutes of 3.9 g tripropoxychlorozirconium (Zr(OPr)$_3$Cl) dissolved in 50 ml toluene. The reaction was continued with stirring at 45° C. for 3 hours.

(3) Preparation of Solid Catalyst Component

[Components (i)+(ii)+(iii)+(iv)]

The procedure for Catalyst Component A was followed except that the above solution of transition metal component was mixed with the carrier (iv) such that the amount of Zr deposits was 2 wt %.

Preparation of Catalyst Component H (1) Pretreatment of Carrier (iv)

The same as for Catalyst Component A.

(2) Preparation of Transition Metal Catalyst

Component [Components (i)+(ii)+(iii)]

A 300 cc three-necked flask was charged with 100 ml refined toluene, 26 ml THF solution of ethylmagnesium chloride (concentration 2 mol/l) and 6.6 g bisindenylethane. The admixture was stirred at room temperature for 30 minutes, followed by addition over 20 minutes of 3.5 g tetraethoxyzirconium (Zr(OEt)$_4$) dissolved in 50 ml toluene. The reaction was continued with stirring at 45° C. for 3 hours.

(3) Preparation of Solid Catalyst Component

[Components (i)+(ii)+(iii)+(iv)]

The procedure for Catalyst Component A was followed except that the above solution of transition metal component was mixed with the above carrier (iv) such that Zr deposits were 1.9 wt %.

Preparation of Catalyst Component I (1) Pretreatment of Carrier (iv)

The same as for Catalyst Component A.

(2) Preparation of Transition Metal Catalyst

Component [Components (i)+(ii)+(iii)]

The procedure for Catalyst Component H was followed except that 4.8 g biscyclopentadienyldimethyl silane was used.

(3) Preparation of Solid Catalyst Component

[Components (i)+(ii)+(iii)+(iv)]

The procedure for Catalyst Component A was followed except that the above solution of transition metal component was mixed with the above carrier (iv) such that Zr deposits were 1.9 wt %.

Preparation of Catalyst Component J–P (1) Pretreatment of Carrier (iv)

The same as for Catalyst Component A.

(2) Preparation of Transition Metal Catalyst

Component [Component (i)+(ii)+(iii)]

The transition metal catalyst components prepared are shown and identified in Table 1.

(3) Preparation of Solid Catalyst Component

[Components (i)+(ii)+(iii)+(iv)]

The procedure for Catalyst Component A was followed to obtain Catalyst Components J–P having respective metal deposits as shown in Table 1.

Preparation of Catalyst Component A'

(1) Pretreatment of Carrier (iv)

A 300 cc three-necked flask was charged with 100 ml refined toluene and 10 g SiO$_2$ (surface area 300 m$^2$/g, Grade No. 952 of Fuji Davison) which had been calcined at 460° C. for 5 hours in nitrogen atmosphere, followed by addition of 6 ml toluene solution of methylalmoxane (concentration 2.5 mmol/ml). The admixture was stirred at room temperature for 2 hours and thereafter dried by nitrogen blow to yield a fluid particulate product.

(2) Preparation of Transition Metal Catalyst

Component [Components (i)+(ii)+(iii)]

A 300 cc three-necked flask was charged with 100 ml refined toluene, 5.84 g triethylaluminum (AlEt$_3$) and 2.2 g indene and cooled at –60° C. A separate flask was charged with 50 ml toluene, 4.2 g tetrapropoxyzirconium (Zr(OPr)$_4$) and 0.8 g indene. This solution was fed into the first flask, and the whole mixture therein was stirred at –60° C. for 1 hour, followed by heating with continued stirring up to 20° C. slowly over 2 hours. The reaction was continued at 45° C. for 3 hours until there was obtained a black solution containing 0.075 mmol/ml Zr.

(3) Preparation of Solid Catalyst Component

[Components (i)+(ii)+(iii)+(iv)]

A 300 cc three-necked flask was charged with 10 g carrier prepared as above in nitrogen atmosphere and 30 ml toluene solution of transition metal catalyst component prepared as above, followed by addition of 15 ml refined toluene. The admixture was stirred at room temperature for 2 hours, followed by removal of the solvent by nitrogen blow in vacuum thereby obtaining 11 g solid catalyst component A'.

Preparation of Catalyst Component B'

(1) Pretreatment of Carrier (iv)

The same as for catalyst component A'.

(2) Preparation of Transition Metal Catalyst

Component [Components (i)+(ii)+(iii)]

A 300 cc three-necked flask was charged with 100 ml refined toluene, 5.84 g triethylaluminum (AlEt$_3$) and 0.60 g cyclopentadiene and cooled at –60° C. A separate flask was charged with 50 ml toluene, 4.2 g tetrapropoxyzirconium and 0.24 g cyclopentadiene. The rest of the procedure was the same as in the preparation of Component A'.

(3) Preparation of Solid Catalyst Component

[Components (i)+(ii)+(iii)+(iv)]

The same as for Catalyst Component A'.

Preparation of Catalyst Component C'

(1) Carrier (iv)

The same SiO$_2$ as in Catalyst Component A' was used. This carrier was not pretreated.

(2) Preparation of Transition Metal Catalyst

Component [Components (i)+(ii)+(iii)]

A 300 cc three-necked flask was charged with 100 ml refined toluene, 13.3 g diethylaluminum ethoxide [AlEt$_2$(OEt)] and 2.4 g cyclopentadiene and cooled at –60° C. A separate flask was charged with 50 ml toluene, 4.2 g Zr(OPr)$_4$ and 1.0 g cyclopendadiene. The rest of the procedure was the same as in the preparation of Component A'.

(3) Preparation of Solid Catalyst Component

[Components (i)+(ii)+(iii)+(iv)]

The same as for Catalyst Component A'.

Preparation of Catalyst Component D'

(1) Pretreatment of Carrier (iv)

In place of silica, there was used alumina Al$_2$O$_3$ (surface area 300 m$^2$/g and average particle size 60 µm) which was pretreated as per Catalyst Component A'.

(2) Preparation of Transition Metal Catalyst

Component [Components (i)+(ii)+(iii)]

A 300 cc three-necked flask was charged with 100 ml refined toluene, 5.84 g triethylaluminum and 2.53 g methylcyclopentadiene and cooled at −60° C. A separate flask was charged with 50 ml toluene, 4.93 g Zr(OBu)$_4$ and 1 g methylcyclopentadiene. The rest of the procedure was the same as in the preparation of Component A'.

(3) Preparation of Solid Catalyst Component

[Components (i)+(ii)+(iii)+(iv)]

The same as for Catalyst Component A'.

Preparation of Catalyst Component E'

(1) Pretreatment of Carrier (iv)

A 400 ml stainless steel pot containing 25 pieces of half inch stainless steel balls was charge with 10 g magnesium anhydrous chloride and 3.8 g triethoxyaluminum. The admixture was subjected to ball-milling in nitrogen atmosphere at room temperature. 10 g milled product was used as the carrier.

(2) Preparation of Transition Metal Catalyst

Component [Components (i)+(ii)+(iii)]

The same as for Catalyst Component A'.

(3) Preparation of Solid Catalyst Component

[Components (i)+(ii)+(iii)+(iv)]

The same as for Catalyst Component A'.

Preparation of Catalyst Component F'

(1) Pretreatment of Carrier (iv)

A 300 ml three-necked flask was charged with 100 ml refined toluene, 10 g polyethylene powder (MFR 1.0/10 min, density 0.92,10 g/cm$^3$, bulk density 0.41 g/cc, particle size 500 μm and melting point 121° C.) and 6 ml toluene solution of methylalmoxane which was uniformly dispersed over the polyethylene powder in nitrogen atmosphere.

(2) Preparation of Transition Metal Catalyst

Component [Components (i)+(ii)+(iii)]

A 300 cc three-necked flask was charged with 100 ml refined toluene, 5.8 g triethylaluminum, 3g indene and 4.2 g Zr(OPr)$_4$ in nitrogen atmosphere at room temperature. The admixture was stirred at 45° C. for 2 hours.

(3) Preparation of Solid Catalyst Component

[Components (i)+(ii)+(iii)+(iv)]

The same as for Catalyst Component A'.

Preparation of Catalyst Component G'

(1) Pretreatment of Carrier (iv)

The procedure for the preparation of Catalyst Component A' was followed except that silica.alumina (surface area 300 m$^2$/g, pore volume 0.7 cc/g and average particle size 50 μm) was used in place of silica.

(2) Preparation of Transition Metal Catalyst

Component [Components (i)+(ii)+(iii)]

A 300 cc three-necked flask was charged with 150 ml refined toluene, 15.4 g AlEt$_2$Cl, 4.2 g Zr(OPr)$_4$ and 3.4 g cyclopentadiene in nitrogen atmosphere at room temperature. The admixture was stirred at 45° C. for 2 hours.

(3) Preparation of Solid Catalyst Component

[Components (i)+(ii)+(iii)+(iv)]

The same as for Catalyst Component A'.

Preparation of Catalyst Component H'

(1) Pretreatment of Carrier (iv)

The same as for Catalyst Component A'.

(2) Preparation of Transition Metal Catalyst

Component [Components (i)+(ii)+(iii)]

A 300 cc three-necked flask was charged with 50 ml refined toluene, 5.84 g triethylaluminum, 4.85 g biscyclopentadienyldimethylsilane, and 3.5 g Zr(OEt)$_4$ in nitrogen atmosphere at room temperature. The admixture was stirred at 45° C. for 2 hours.

(3) Preparation of Solid Catalyst Component

[Components (i)+(ii)+(iii)+(iv)]

The same as for Catalyst Component A'.

Preparation of Catalyst Component I'

(1) Pretreatment of Carrier (iv)

The same as for Catalyst Component A'.

(2) Preparation of Transition Metal Catalyst

Component [Components (i)+(ii)+(iii)]

A 300 cc three-necked flask was charged with 150 ml refined toluene, 5.84 g triethylaluminum, 3.7 g biscyclopentadienylmethane and 4.2 g Zr(OPr)$_4$ in nitrogen atmosphere at room temperature. The admixture was stirred at 45° C. for 2 hours.

(3) Preparation of Solid Catalyst Component

[Components (i)+(ii)+(iii)+(iv)]

The same as for Catalyst Component A'.

Preparation of Catalyst Component J'

(1) Pretreatment of Carrier (iv)

The procedure for Catalyst Component A' was followed except that 15 ml toluene solution of trimethylaluminum (concentration 1 mmol/ml) was used in place of methylalmoxane.

(2) Preparation of Transition Metal Catalyst

Component [Component (i)+(ii)+(iii)]

A 300 cc three necked flask was charged with 150 ml refined toluene, 11.7 g triethylaluminum, 13.4 g bisindenylethane and 3.9 g Zr(OPr)$_4$Cl in nitrogen atmosphere at room temperature. The admixture was stirred at 45° C. for 2 hours.

(3) Preparation of Solid Catalyst Component

[Components (i)+(ii)+(iii)+(iv)]

The procedure for Catalyst Component A' was followed.

Preparation of Catalyst Component K'

(1) Pretreatment of Carrier (iv)

The same as for catalyst component A'.

(2) Preparation of Transition Metal Catalyst

Component [Components (i)+(ii)+(iii)]

3 g zirconium tetrachloride was admixed with an ether solution of magnesium benzylchloride and let alone at −20° C. for 2 hours, followed by stirring at room temperature for 2 hours. Byproduced MgCl$_2$ was removed, and the ether solution was concentrated and cooled to −20° C. until there was obtained a crystalline product (ZrBz$_4$) having a melting point of 112.8° C.

A 300 cc three-necked flask was charged with 150 ml refined toluene, 14.6 g triethylaluminum, 2.54 g cyclopentadiene and 5.8 g ZrBz$_4$. The admixture was stirred at 45° C. for 2 hours.

(3) Preparation of Solid Catalyst Component

[Components (i)+(ii)+(iii)+(iv)]

The same as for Catalyst Component A'.

Preparation of Catalyst Component L'

(1) Pretreatment of Carrier (iv)

The same as for catalyst component A'.

(2) Preparation of Transition Metal Catalyst

Component [Components (i)+(ii)+(iii)]

The procedure for Catalyst Component K' was followed except that titanium tetrachloride was used in place of zirconium tetrachloride to produce TiBz$_4$.

A 300 cc three-necked flask was charged with 150 ml refined toluene, 14.6 g triethylaluminum, 5.2 g pentamethylcyclopentadiene and 5.3 g TiBz$_4$ in nitrogen atmosphere. The admixture was stirred at 45° C. for 2 hours.

(3) Preparation of Solid Catalyst Component

[Components (i)+(ii)+(iii)+(iv)]

The same as for Catalyst Component A'.

Preparation of Catalyst Component M'

(1) Pretreatment of Carrier (iv)

The same as for catalyst component A'.

(2) Preparation of Transition Metal Catalyst

Component [Components (i)+(ii)+(iii)]

The procedure for Catalyst Component K' was followed except that hafnium tetrachloride was used in place of $ZrBz_4$ to produce $HfBz_4$.

A 300 cc three-necked flask was charged with 150 ml refined toluene, 14.6 g triethylaluminum, 2.54 g cyclopentadiene and 5.8 g $ZrBz_4$. The admixture was stirred at 45° C. for 2 hours.

(3) Preparation of Solid Catalyst Component

[Components (i)+(ii)+(iii)+(iv)]

The same as for Catalyst Component A'.

Preparation of Catalyst Component N'

(1) Pretreatment of Carrier (iv)

The procedure for Catalyst Component A' was followed except that 15 ml hexane solution of $Zr(OPr)_4$ (concentration 1 mmol/ml) was used in place of methylalmoxane.

(2) Preparation of Solid Catalyst Component

[Components (i)+(ii)+(iii)+(iv)]

A 300 cc three-necked flask was charged with 10 g carrier prepared as above, 100 ml refined n-hexane, 0.84 g triethylaluminum and 0.12 g cyclopentadiene. The admixture was stirred at room temperature for 2 hours, followed by addition of 0.5 g $Zr(OEt)_4$, and thereafter stirred at 45° C. for 2 hours in nitrogen atmosphere. The solvent was removed by nitrogen blow in vacuum.

Preparation of Catalyst Component O'

(1) Pretreatment of Carrier (iv)

The procedure for Catalyst Component A' was followed except that 10 g $Mg(CO_3)_2$ powder dried at 150° C. for 2 hours was used in place of silica.

(2) Preparation of Transition Metal Catalyst

The same as for Catalyst Component A'.

(3) Preparation of Solid Catalyst Component

[Components (i)+(ii)+(iii)+(iv)]

The same as for Catalyst Component A'.

INVENTIVE EXAMPLE 1

A 3-liter stainless steel autoclave equipped with stirrer was purged with nitrogen and thereafter supplied with 200 g of dry salt, 22 ml of 1 mmol/ml methylalmoxane solution and 100 mg of Catalyst Component A. The admixture was heated at 60° C. with stirring. A mix of ethylene and butene-1 gases (butene-1/ethylene molar ratio 0.25) was charged to bring the reactor pressure up to 9 $kgf/cm^2G$, whereupon polymerization reaction was initiated and continued for 1 hour with continued charge of a mixed gas of ethylene and butene-1 (butene-1/ethylene molar ratio 0.05) to maintain the reaction system at 9 $kgfr/cm^2G$.

Upon completion of the reaction, excess gas was removed from the reactor which was then cooled to yield 66 grams of a white polymer.

INVENTIVE EXAMPLES 2–16

The procedure of Inventive Example 1 was followed for the polymerization under the conditions shown in Table 1 and with the results shown in Table 2.

INVENTIVE EXAMPLE 17

The procedure of Inventive Example 1 was followed for homopolymerization of ethylene under the conditions indicated in Table 1 and with the results shown in Table 2, except that an ethylene gas was used for pressure control in place of a mixed gas of ethylene and butene-1.

INVENTIVE EXAMPLE 18

The procedure of Inventive Example 1 was followed except that propylene gas was used in the homopolymerization of propylene and that the reaction temperature and pressure were 50° C. and 7 $kgf/cm^2G$, respectively.

COMPARATIVE EXAMPLE 1–3

The procedure of Inventive Example 1 was followed under the conditions shown in Table 1 and with the results in Table 2.

INVENTIVE EXAMPLE 19

A 3-liter stainless steel autoclave equipped with stirrer was purged with nitrogen and thereafter supplied with 200 g of dry salt, 22 ml of 1 mmol/ml methylalmoxane solution and 100 mg of Catalyst Component A'. The admixture was heated at 60° C. with stirring. A mix of ethylene and butene-1 gases (butene-1/ethylene molar ratio 0.25) was charged to bring the reactor pressure up to 9 $kgf/cm^2G$, whereupon polymerization reaction was initiated and continued for 1 hour with continued charge of a mixed gas of ethylene and butene-1 (butene-1/ethylene molar ratio 0.05) to maintain the reaction system at 9 $kgfr/cm^2G$.

Upon completion of the reaction, excess gas was removed from the reactor which was then cooled to yield 76 grams of a white polymer.

Table 2 shows the polymerization results and the properties of resultant polymers (Inventive Examples 1–18 and Comparative Examples 1–3).

INVENTIVE EXAMPLES 20–35

The procedure of Inventive Example 19 was followed that Catalyst Components B'–O' were used in place of Catalyst Component A' as indicated in Table 3.

COMPARATIVE EXAMPLES 4–6

The procedure of Inventive Example 19 was followed except that Catalyst Components T, U and V were used in place of Catalyst Component A'.

Table 4 shows the polymerization results and the properties of resultant polymers (Inventive Examples 19–35 and Comparative Examples 4–6).

Each of the polymers obtained in the respective Inventive and Comparative Examples was subjected to the following tests.

Melt Index (MI) The procedure of ASTM D1238-57T was followed.

Density (D) The procedure of ASTM D1505-68 was followed.

Melting Point by Calorimetry (DSC)

5 mg of the polymer sample was disposed at 180° C. for 3 minutes, cooled to 0° C. over 10° C./min and allowed to stand at 0° C. for 10 minutes, followed by heating with a temperature rise of 10° C./min with use of a melting point tester (Seiko Electronics DSC-20).

TABLE 1

| | Catalyst lot | solid catalyst component | | | | composition ratio (i):(iii):(ii) mol ratio | transition metal deposits wt % | amount of addition during polymerization | | Al/Me ratio |
|---|---|---|---|---|---|---|---|---|---|---|
| | | carrier (iv) | component (i) | component (iii) | component (ii) | | | transition metal mg | modified Al | |
| IE 1 | A | SiO$_2$-MAO | Zr(OPr)$_4$ | indene | EtMgCl | 1:4:8 | 2 | 1.9 | MAO | 1000 |
| 2 | B | " | " | cyclopentadiene | Et$_3$B | " | " | 2.0 | " | " |
| 3 | C | SiO$_2$ | " | " | nBuMgCl | 1:2:4 | 1.9 | 1.8 | " | " |
| 4 | D | MgCl$_2$—Al(OEt)$_3$ | " | indene | Et$_2$Zn | 1:4:10 | 1.8 | 1.7 | " | " |
| 5 | E | PE polymer-MAO | " | " | EtMgBr | " | 2.0 | 1.9 | " | " |
| 6 | F | Al$_2$O$_3$ | Zr(OBu)$_4$ | methylcyclopendadiene | " | " | " | 2.1 | " | " |
| 7 | G | SiO$_2$—AlMe$_3$ | Zr(OPr)$_3$Cl | cyclopentadiene | EtMgCl | " | " | 1.7 | " | " |
| 8 | H | SiO$_2$-MAO | Zr(OEt)$_4$ | bis-indenyl-ethane | " | 1:2:4 | 1.9 | 1.8 | " | " |
| 9 | I | " | " | bis-cyclopendadienyl dimethyl silane | " | " | " | 1.9 | " | " |
| 10 | J | " | " | bis-cyclopentadienyl metane | " | " | " | 1.8 | " | " |
| IE 11 | K | SiO$_2$-MAO | $^{(1)}$Ti(OBu)$_3$Cl | cyclopentadiene | EtMgCl | 1:3:10 | 2.0 | 2.3 | MAO | 1000 |
| 12 | L | " | ZrBz$_4$ | " | " | 1:4:8 | " | 1.9 | " | " |
| 13 | M | " | $^{(2)}$Zr(neophil)$_4$ | pentamethyl-cyclopendadiene | " | " | " | 1.7 | " | " |
| 14 | N | " | ZrCl$_4$ | cyclopendadiene | EtLi | 1:2:6 | " | 2.1 | " | " |
| 15 | O | " | TiCl$_4$ | " | EtMgCl | 1:2:4 | " | 2.0 | " | " |
| 16 | P | " | Hf(OPr)$_4$ | " | " | 1:4:8 | " | 2.4 | " | " |
| 17 | H | " | Zr(OEt)$_4$ | bis-indenyl-ethane | " | 1:2:4 | 1.9 | 1.8 | " | " |
| 18 | H | " | " | bis-indenyl-ethane | " | " | " | " | " | " |
| CE 1 | Q | — | Zr(OPr)$_4$ | indene | EtMgCl | 1:4:8 | — | 1.7 | " | " |
| 2 | R | SiO$_2$-MAO | " | — | " | 1:0:7 | 2 | 1.6 | " | " |
| 3 | S | " | " | indene | — | 1:4:0 | " | 1.5 | " | " |

IE: Inventive Example  CE: Comparative Example
$^{(1)}$tri-n-butoxymonochlorotitanium
$^{(2)}$tetraneophyl zirconium

TABLE 2

| | yield g | catalytic activity g/gMe | MFR g/10 min | bulk density g/cc | polymer density g/cm$^3$ | melting point °C. |
|---|---|---|---|---|---|---|
| IE 1 | 66 | 35,000 | 0.8 | 0.39 | 0.9210 | 114.0 |
| 2 | 102 | 51,000 | 4.8 | 0.40 | 0.9215 | 104.7 |
| 3 | 82 | 46,000 | 5.1 | 0.38 | 0.9220 | 106.8 |
| 4 | 62 | 37,000 | 0.6 | 0.35 | 0.9119 | 113.0 |
| 5 | 74 | 39,000 | 0.4 | 0.33 | 0.9117 | 112.8 |
| 6 | 90 | 43,000 | 2.1 | 0.41 | 0.9213 | 104.1 |
| 7 | 97 | 57,000 | 3.8 | 0.37 | 0.9225 | 106.3 |
| 8 | 90 | 50,000 | 1.1 | 0.42 | 0.9218 | 108.7 |
| 9 | 74 | 39,000 | 3.9 | 0.38 | 0.9119 | 103.8 |
| 10 | 52 | 29,000 | 2.5 | 0.39 | 0.9220 | 103.1 |
| 11 | 53 | 23,000 | 3.7 | 0.36 | 0.9208 | 104.1 |
| 12 | 59 | 31,000 | 8.4 | 0.35 | 0.9116 | 101.1 |
| 13 | 70 | 41,000 | 7.9 | 0.38 | 0.9218 | 107.3 |
| 14 | 69 | 33,000 | 12.2 | 0.39 | 0.9231 | 108.0 |
| 15 | 56 | 28,000 | 4.7 | 0.39 | 0.9222 | 106.9 |
| 16 | 50 | 21,000 | 3.2 | 0.34 | 0.9210 | 103.9 |
| 17 | 106 | 59,000 | 2.8 | 0.41 | 0.9508 | 135.1 |
| 18 | 56 | 31,000 | 2.0 | 0.37 | 0.9021 | 138.9 |
| CE 1 | 114 | 67,000 | 0.8 | 0.24 | 0.9196 | 113.0 |
| 2 | 0 | 0 | — | — | — | — |
| 3 | 17 | 11,000 | 1.3 | 0.40 | 0.9280 | 115.8 |

TABLE 3

| | Catalyst lot | solid catalyst component | | | | composition ratio (i):(iii):(ii) mol ratio | transition metal deposits wt % | amount of addition during polymerization | | Al/Me ratio |
|---|---|---|---|---|---|---|---|---|---|---|
| | | carrier (iv) | component (i) | component (iii) | component (ii) | | | transition metal mg | modified Al | |
| IE 19 | A' | SiO$_2$-MAO | Zr(OPr)$_4$ | indene | AlEt$_3$ | 1:2:4 | 2 | 2 | MAO | 1000 |
| 20 | B' | " | " | cyclopentadiene | " | " | 1.5 | " | " | " |
| 21 | C' | SiO$_2$ | " | " | AlEt$_2$(OEt) | 1:4:8 | " | 1.8 | " | " |

TABLE 3-continued

| Catalyst lot | carrier (iv) | solid catalyst component component (i) | component (iii) | composition component (ii) | ratio (i):(iii):(ii) mol ratio | transition metal deposits wt % | amount of addition during polymerization transition metal mg | modified Al | Al/Me ratio |
|---|---|---|---|---|---|---|---|---|---|
| 22 | D' | Al$_2$O$_3$-MAO | Zr(OBu)$_4$ | methylcyclopentadiene | AlEt$_3$ | 1:2:4 | 1.8 | 1.7 | " | " |
| 23 | E' | MgCl$_2$-Al(OEt)$_3$ | Zr(OPr)$_4$ | indene | " | " | 2.0 | 1.8 | " | " |
| 24 | F' | PE polymer-MAO | " | " | " | " | " | 1.9 | " | " |
| 25 | G' | SiO$_2$ · Al$_2$O$_3$-MAO | " | cyclopentadiene | AlEt$_2$Cl | 1:4:10 | " | 1.7 | " | " |
| 26 | H' | SiO$_2$-MAO | Zr(OEt)$_4$ | bis-cyclopentadienyl-dimethyl silane | AlEt$_3$ | 1:2:4 | " | 1.6 | " | " |
| 27 | I' | " | Zr(OPr)$_4$ | bis-cyclopendadienyl-methane | " | " | " | 1.9 | " | " |
| 28 | J' | SiO$_2$—AlMe$_3$ | Zr(OPr)$_3$Cl | bis-indenyl-ethane | " | 1:4:8 | " | 1.8 | " | " |
| IE 29 | K' | SiO$_2$-MAO | ZrBz$_4$ | cyclopendadiene | AlEt$_3$ | 1:3:10 | 1.9 | 1.7 | MAO | 1000 |
| 30 | L' | " | TiBz$_2$ | pentamethyl-cyclopendadiene | " | " | 2.0 | 1.9 | " | " |
| 31 | M' | " | HfBz$_4$(1) | cyclopendadiene | " | " | 1.8 | 2.5 | " | " |
| 32 | J' | SiO$_2$ | Zr(OPr)$_3$Cl | bis-indenyl-ethane | " | 1:4:8 | 2.0 | 1.6 | " | " |
| 33 | J' | " | " | bis-indenyl-ethane | " | " | 2.0 | 2.7 | " | " |
| 34 | N' | SiO$_2$—Zr(OPr)$_4$ | Zr(OEt)$_4$ | cyclopendadiene | " | 1:2:4 | 10.0 | 1.8 | " | " |
| 35 | O" | MKg(CO$_3$)$_2$-MAO | Zr(OPr)$_4$ | indene | " | " | 2.0 | 1.9 | " | " |
| CE 4 | T | — | Zr(OPr)$_4$ | indene | AlEt$_3$ | 1:2:4 | — | 1.7 | " | " |
| 5 | U | SiO$_2$MAO | " | — | " | 1:0:4 | 2 | 1.6 | " | " |
| 6 | V | " | " | indene | " | 1:2:0 | " | 1.5 | " | " |

IE: Inventive Example  CE: Comparative Example
(1) tetrabenzyl hafnium

TABLE 4

| | yield g | catalytic activity g/gMe | MFR g/10 min | bulk density g/cc | polymer density g/cm$^3$ | melting point °C. |
|---|---|---|---|---|---|---|
| IE 19 | 76 | 38,000 | 0.9 | 0.38 | 0.9221 | 114.1 |
| 20 | 98 | 49,000 | 3.8 | 0.40 | 0.9215 | 104.5 |
| 21 | 57 | 32,000 | 4.3 | 0.41 | 0.9228 | 105.1 |
| 22 | 73 | 43,000 | 2.8 | 0.39 | 0.9233 | 106.3 |
| 23 | 67 | 37,000 | 0.7 | 0.30 | 0.9218 | 113.8 |
| 24 | 76 | 40,000 | 0.8 | 0.33 | 0.9233 | 114.5 |
| 25 | 86 | 51,000 | 3.5 | 0.40 | 0.9235 | 106.5 |
| 26 | 61 | 38,000 | 2.3 | 0.41 | 0.9229 | 105.3 |
| 27 | 44 | 23,000 | 4.5 | 0.38 | 0.9217 | 104.8 |
| 28 | 95 | 53,000 | 0.9 | 0.40 | 0.9215 | 107.3 |
| 29 | 73 | 43,000 | 6.2 | 0.36 | 0.9217 | 105.1 |
| 30 | 66 | 35,000 | 1.1 | 0.35 | 0.9234 | 98.0 |
| 31 | 72 | 29,000 | 2.9 | 0.39 | 0.9236 | 106.4 |
| 32 | 97 | 61,000 | 1.5 | 0.42 | 0.9510 | 135.1 |
| 33 | 99 | 37,000 | 1.9 | 0.37 | 0.9054 | 139.7 |
| 34 | 94 | 52,000 | 8.0 | 0.37 | 0.9218 | 105.7 |
| 35 | 47 | 25,000 | 0.1 | 0.31 | 0.9219 | 113.9 |
| CE 4 | 95 | 56,000 | 0.08 | 0.20 | 0.9196 | 113.0 |
| 5 | 0 | 0 | — | — | — | — |
| 6 | 17 | 11,000 | 1.3 | 0.40 | 0.9280 | 115.8 |

IE: Inventive Example  CE: Comparative Example

What is claimed is:

1. A catalyst composition for use in the manufacture of polyolefins which is comprised of a first component (I) and a second component (II), wherein said first component (I) consists essentially of a reaction product of a compound (i) of formula Me$^1$R$^1_n$X$^1_{4-n}$ wherein R$^1$ is selected from the group consisting of an alkyl, alkenyl, aryl, alkoxy, aryloxy, and aralkyloxy moiety of 1–24 carbon atoms, X$^1$ is a halogen atom, Me$^1$ is zirconium, titanium or hafnium, and n is an integer of 0<n<4;

a compound (ii) of formula

Me$^2$R$^2_m$X$^2_{z-m}$ wherein R$^2$ is a hydrocarbon group of 1–24 carbon atoms, X$^2$ is a halogen atom, Me$^2$ is an element of Groups II–III in the Periodic Table, z is the valence of Me$^2$, and m is a number such that 0≦m≦3;

a cyclic hydrocarbon compound (iii) having two or more conjugated double bonds;

wherein the molar ratio of the compound (ii) to the compound (i) is in the range of 0.1:1 to 100:1, and the molar ratio of the compound (iii) to the compound (i) is in the range of 0.1:1 to 10:1; and a carrier (iv) selected from the group consisting of inorganic carriers, particulate polymer carriers, and mixtures thereof;

said second component (II) being a modified organoaluminum compound having at least one Al—O—Al bond derived from the reaction of an organoaluminum compound and water.

2. A catalyst composition as claimed in claim 1 wherein R$^1$ is selected from the group consisting of methyl, ethyl, propyl, butyl, pentyl, hexyl, octyl, vinyl, allyl, phenyl, tolyl, xylyl, methoxy, ethoxy, propoxy, butoxy, pentyloxy, phenoxy, tolyloxy and benzyloxy.

3. A catalyst composition as claimed in claim 1 wherein R$^2$ is an alkyl, alkenyl, aryl or aralkyl group.

27

4. A catalyst composition as claimed in claim 1 wherein $R^2$ is selected from the group consisting of methyl, ethyl, propyl, iso-propyl, butyl, pentyl, hexyl, octyl, decyl, dodecyl, vinyl, allyl, phenyl, tolyl, xylyl, benzyl, phenethyl and styryl.

5. A catalyst composition as claimed in claim 1 wherein said compound (ii) is an organoaluminum compound of the formula $$R_3Al, R_2AlX, RAlX_2 \text{ or } R_3Al_2X_3$$

wherein R is a hydrocarbon group of 1–5 carbon atoms and X is a halogen atom.

6. A catalyst composition as claimed in claim 1 wherein said cyclic hydrocarbon compound (iii) has 2–4 conjugated double bonds and a carbon number of 4–24 in the molecule.

7. A catalyst composition as claimed in claim 1 wherein said cyclic hydrocarbon compound (iii) is selected from the group consisting of an aralkylene of 7–24 carbon atoms, cyclopentadiene, cyclopentadiene substituted with an alkyl or aralkyl group of 1–12 carbon atoms, indene, indene substituted with an alkyl or aralkyl group of 1–12 carbon atoms, fluorene, fluorene substituted with an alkyl or aralkyl group of 1–12 carbon atoms, cycloheptatriene, cycloheptatriene substituted with an alkyl or aralkyl group of 1–12 carbon atoms, cyclooctatetraene, cyclooctatetraene substituted with an alkyl or aralkyl group of 1–12 carbon atoms and derivatives thereof cross-linked with an alkylene group.

8. A catalyst composition as claimed in claim 7 wherein said alkylene group has 2–8 carbon atoms.

9. A catalyst composition as claimed in claim 1 wherein said cyclic hydrocarbon compound (iii) is selected from the group consisting of cyclopentadiene, methylcyclopentadiene, ethylcyclopentadiene, t-butylcyclopentadiene, hexylcyclopentadiene, octylcyclopentadiene, 1,2-dimethylcyclopentadiene, 1,3-dimethylcyclopentadiene, 1,2,4-trimethylcyclopentadiene, 1,2,3,4-tetramethylcyclopentadiene, pentamethylcyclopentadiene, indene, 4-methyl-1-indene, 4,7-dimethylindene, 4,5,6,7-tetrahydroindene, fluorene, methylfluorene, cycloheptatriene, methylcycloheptatriene, cyclooctatetraene, methylcyclooctatetraene, bis-indenylethane, bis(4,5,6,7-tetrahydro-1-indenyl)ethane, 1,3-propanedinyl-bisindene, 1,3-propanedinyl-bis(4,5,6,7-tetrahydro)indene, propylene-bis(1-indene), isopropyl(1-indenyl) cyclopentadiene, diphenylmethylene(9-fluorenyl) cyclopentadiene and isopropylcyclopentadienyl-1-fluorene.

10. A catalyst composition as claimed in claim 1 wherein said inorganic carrier (iv) is formed of a porous inorganic compound selected from the group consisting of a carbonaceous material, metal, metal oxide, metal chloride, metal carbonate and mixtures thereof, said inorganic carrier having a maximum length of 5–200 μm, the maximum length referring to the distance between those two points on the surface of the carrier that are furthest from each other, a surface area of 50–1,000 m²/g and a pore volume of 0.05–3 cm³/g.

11. A catalyst composition as claimed in claim 10 wherein said carrier (iv) is treated with an agent selected from the group consisting of an active hydrogen-containing

28 compound, an electron-donative compound and an alkoxide-containing compound.

12. A catalyst composition as claimed in claim 11 wherein said active hydrogen-containing compound is an alcohol or an aldehyde, said electron-donative compound is an ester or an ether, and said alkoxide-containing compound is a tetraalkoxysilicate, a trialkoxyaluminum or a transition metal tetraalkoxide.

13. A catalyst composition as claimed in claim 1 wherein said particulate polymer carrier (iv) is formed of a thermoplastic or thermosetting resin having an average particle size of 5–2,000 μm.

14. A catalyst composition as claimed in claim 1 wherein n is not equal to zero and at least one of $R^1$ is selected from the group consisting of an alkoxy, aryloxy and aralkyloxy moiety of 1–8 carbon atoms.

15. A catalyst composition as claimed in claim 1 wherein the modified organoaluminum compound has 1–100 Al—O—Al bonds in the molecule.

16. A catalyst composition as claimed in claim 1 wherein the modified organoaluminum compound has 1–50 Al—O—Al bonds in the molecule.

17. A catalyst composition as claimed in claim 1 wherein the organoaluminum compound of component (II) is a compound of the formula $$R_v^5AlX_{3-v}^5$$

where $R^5$ is an alkyl, alkenyl, aryl or aralkyl group having a carbon number of 1–18, $X^5$ is hydrogen or halogen atom, and $1 \leq v \leq 3$.

18. A catalyst composition as claimed in claim 1 wherein the molar ratio of the organoaluminum compound to water is in the range of 1:0.25 to 1:1.2.

19. A catalyst component as claimed in claim 1 wherein the molar ratio of said compound (ii) to said compound (i) is in the range of 0.1:1 to 100:1, and the molar ratio of said compound (iii) to said compound (ii) is in the range of 0.1:1 to 10:1.

20. A catalyst composition as claimed in claim 1 wherein the ratio of said compound (i) to said carrier (iv) is in the range of 0.01–500 millimoles of said compound (i) per 100 g of said carrier (iv).

21. A catalyst composition as claimed in claim 1 wherein the ratio of said compound (i) to said carrier (iv) is in the range of 0.1–20 millimoles of said compound (i) per 100 g of said carrier (iv).

22. A catalyst composition as claimed in claim 1 wherein the atomic ratio of aluminum in the second component (II) to the transition metal in the first component (I) is in the range of 1:1 to 100,000:1.

23. A catalyst composition as claimed in claim 1 wherein the atomic ratio of aluminum in the second component (II) to the transition metal in the first component (I) is in the range of 5:1 to 1,000:1.

24. A catalyst composition as claimed in claim 1 wherein $Me^2$ is an element of Group III in the Periodic Table.

* * * * *